United States Patent [19]

Day

[11] Patent Number: 4,946,375

[45] Date of Patent: Aug. 7, 1990

[54] LOW TEMPERATURE FINISH

[75] Inventor: Fleming H. Day, Greenville, N.C.

[73] Assignee: E. I. Du Pont de Nemours and Company, Wilmington, Del.

[21] Appl. No.: 386,191

[22] Filed: Jul. 17, 1989

Related U.S. Application Data

[63] Continuation of Ser. No. 73,534, Jul. 15, 1987, abandoned.

[51] Int. Cl.$^5$ .............................................. B32B 27/34
[52] U.S. Cl. ................................... 428/395; 428/375; 57/250; 57/251; 57/258
[58] Field of Search ............... 428/375, 378, 394, 395; 57/250, 251, 258

[56] References Cited

U.S. PATENT DOCUMENTS

| | | | |
|---|---|---|---|
| 3,827,114 | 8/1974 | Crossfield | 28/75 WT |
| 3,997,450 | 12/1976 | Steinmiller | 252/8.7 |
| 4,069,160 | 1/1978 | Hawkins | 252/8.9 |
| 4,086,949 | 5/1978 | Uy | 152/359 |
| 4,137,181 | 1/1979 | Hawkins | 252/8.9 |
| 4,294,883 | 10/1981 | Hawkins | 428/361 |

OTHER PUBLICATIONS

Research Disclosure 19520—Jul., 1980.
Research Disclosure 18407—Aug., 1979.
Research Disclosure 17216—Aug., 1978.
Research Disclosure 17105—Jul., 1978.
Research Disclosure 16949—May, 1978.
U.S. Ser. No. 911,678—Andrews et al.—filed Sep. 26, 1986.

*Primary Examiner*—Lorraine T. Kendell

[57] ABSTRACT

A polyamide yarn especially suitable as a tire yarn having 0.2-2.0 wt. % of a finish, said finish consisting essentially of 50-95 wt. % lubricants having a melting point not greater than about 12° C., wherein at least 40 wt. % of the lubricants is pentaerythritol tetrapelargonate, 5-50 wt. % of the finish is sorbitan triester adduct with 10-30 moles ethylene oxide, 0-5 wt. % of the finish is antioxidant and 0-2 wt. % of finish is a polysiloxane.

7 Claims, 1 Drawing Sheet

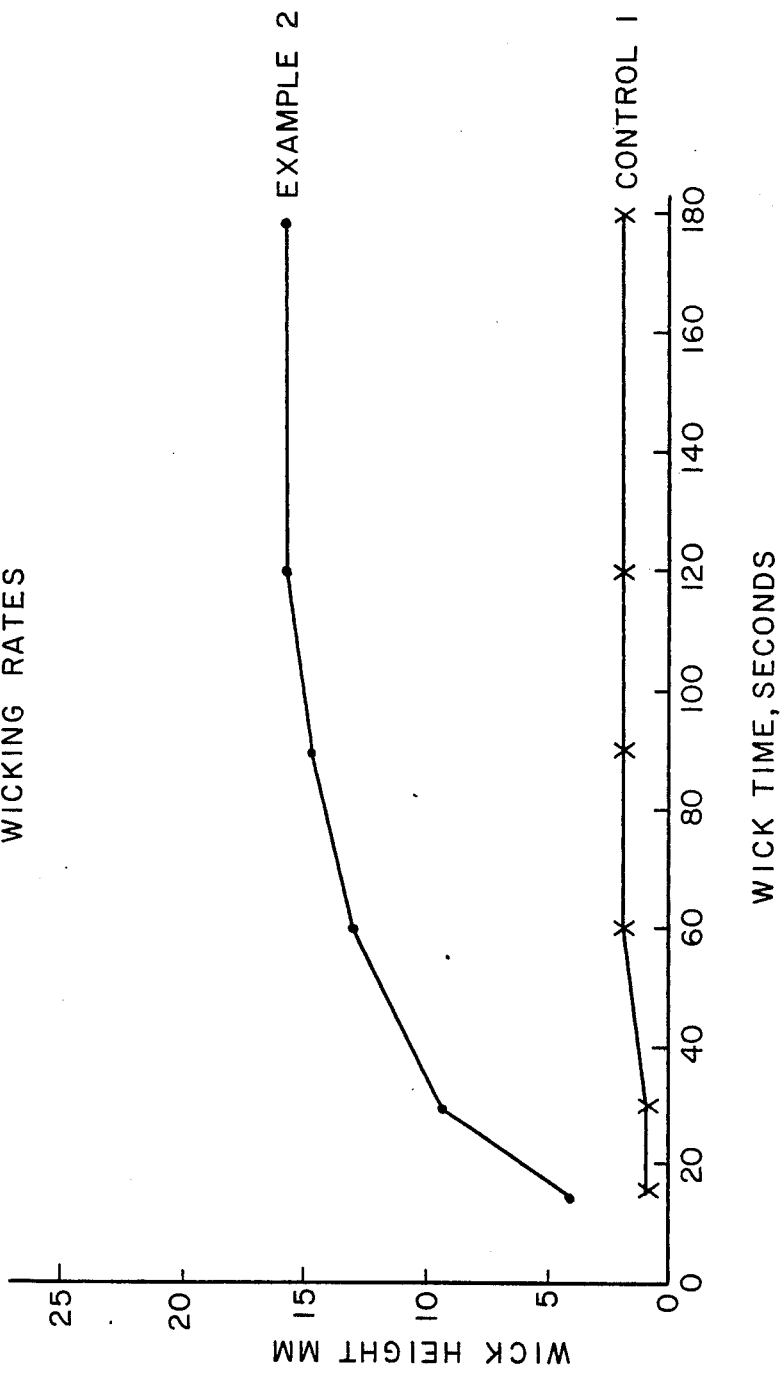

LOW TEMPERATURE FINISH

This is a continuation of application Ser. No. 07/073,534, filed July 15, 1987, and now abandoned.

TECHNICAL FIELD

This invention relates generally to a polyamide yarn especially suitable as a tire yarn having a finish containing 50-95% lubricants having a melting point not greater than about 12° C., wherein at least 40 wt. % of the lubricants is pentaerythritol tetrapelargonate, 5-50 wt. % of the finish is sorbitan triester adduct having 10-30 moles of ethylene oxide, 0-5 wt. % of the finish is antioxidant and 0-2 wt. % of finish is a polysiloxane.

BACKGROUND

When commonly available nylon industrial yarns, as tire cord or in tire cord fabric form, are dipped in aqueous resorcinol-formaldehyde-latex (RFL) mixtures at low temperatures (<25° C.), the cord or cord fabric so formed has relatively poor adhesion to rubber stock. Typical lubricants in finishes on such yarns which give poor adhesion at low temperatures are triglycerides, like coconut oil and rearranged unsaturated triglycerides. The adhesion problem becomes particularly acute as the dipping temperature approaches 0° C. The poor adhesion is believed to be caused by the relatively low pickup of the RFL material. A yarn or yarn finish which solves this cold weather adhesion problem would be desirable.

SUMMARY OF THE INVENTION

A polyamide yarn especially suitable as a tire yarn having 0.2-2.0 wt. % of finish, said finish consisting essentially of 50-95 wt. % lubricants having a melting point not greater than about 12° C., wherein at least 40 wt. %, preferably 100%, of the lubricants is pentaerythritol tetrapelargonate (PETP), 5-50 wt. % of the finish is sorbitan triester adduct with 10-30 moles of ethylene oxide, 0-5 wt. % of finish is antioxidant preferably 4,4'-Butylidene-bis-(6-t-butyl-m-cresol) and 0-2 wt. % of the finish is a polysiloxane.

The relatively low pick-up of RFL material at low temperatures by nylon industrial yarns is believed to be caused by the water repelling action of the relatively hydrophobic lubricant in the finish on the yarn. It is further believed that an important element in this water repelling action of the lubricant is the fact that it tends to solidify at <25° C. and forms a solid film which tends to reduce dip wicking and, hence, result in significantly lower dip pick up. It is surprising that the PETP based finish performs well with regard to dip wicking and hot 2-ply adhesion to rubber when RFL dipping occurs at or near 0° C. Since PETP freezes at about 11°-12° C., it would be expected that RFL dip pickup would be inhibited at temperatures of <11°-12° C. It is not known why this finish functions so well below 11°-12° C.

The second principle component of the finish, 5-50 wt. %, is a sorbitan triester adduct with 10-30 moles of ethylene oxide, which serves as surfactant and antistat. Thus, it dissipates accumulated static charges on the yarn threadline during yarn manufacture and customer processing, primarily through its polyethylene oxide content. The combination of hydrophobic group, sorbitan triester, and hyrophilic group, 10-30 moles of ethylene oxide, give the component its surfactant character which provides the finish and the finish-containing yarn with their desirable wetting properties. The relatively high molecular weight of this component is needed to provide acceptably low fuming during the high temperature processing of yarn manufacture and customer processing. A preferred composition is sorbitan trioleate adduct with 20 moles of ethylene oxide.

In addition to the surprisingly good wicking properties at low temperatures, polyamide yarns containing the finish of this invention gave a surprisingly good balance of performance on commercial-scale equipment, including: efficient operability during yarn manufacture; low finish varnishing on heated surfaces; low fuming during yarn and tire manufacturing; and good adhesion of the yarn, as cord, to rubber.

The yarns of this invention are polyamide yarns having the desired finish which are suitable as tire yarns. Examples of such yarns are polyhexamethylene adipamide, polycapramide, polytetramethylene adipamide and copolymers thereof.

TEST METHODS

Tire yarn samples were converted into tire cord before testing for dip pick-up (DPU), wicking of dip, and hot 2-ply adhesion.

Dip Pickup

Dip pickup (DPU) is determined by placing a dried and weighed sample (about 0.8 g.) of dipped cord (cut to about ½ inch lengths) in 100 ml of 90% Formic acid, refluxing 20-30 minutes to dissolve the nylon fiber, filtering off the undissolved RFL dip, rinsing with water and methanol, drying and weighing residual RFL dip.

% DPU=100X (Wt. of Residual RFL Dip/(Wt. of Dried Dipped Cord Sample - Wt. of Residual RFL Dip))

Wicking Of Dip

Wicking experiments of dip materials were run in a cold room at 0° C. The greige cords, 1890/1/2 (8.1×8.1 tpi), and dip were conditioned in the cold room at least 16 hours before testing. A 750 g. weight (brass) was suspended from a loop in the greige cord and the weight and lower portion of the vertically mounted cord were immersed in the dip. The wicking values reported are the heights in mm above the liquid surface level of the dip that the dip materials reached in the cords. The RFL dip was D5A containing 15% solids and a small quantity of carbon black. D5A is a mixture of resorcinol and formaldehyde resin with latex. The resin is prepared by mixing resorcinol with formaldehyde in aqueous sodium hydroxide at room temperature (mole ratio of resorcinol to formaldehyde is 1 to 2). The resin is then mixed with a latex comprised of styrene/butadiene/vinylpyridine terpolymer at room temperature (weight ratio of latex to resin is 6 to 1). Further details on the composition of D5A are available in the bulletin on "Gen-Tac" Vinylpyridine Latex; Chemical Plastics Div., General Tire Co., Akron, Ohio; page 3, Form 7055-4-70-3M. The D5A dip containing carbon is called D5C. The carbon is a visual aid in detecting wicking.

Hot, Two-Ply Strip Adhesion Test

The test utilized was the same as ASTM Test D-4393-85, Strip Peel Adhesion of Reinforcing Cords or Fabrics to Rubber Compounds (pages 1133-1142; 1985 Annual Book of ASTM Standards, Section 7, Volume 7.01) with a few modifications. The particular variation used was to test individual tire cords, 1260 denier/2 ply or 1890 denier/2 ply, that had been RFL dipped singly.

The rubber stock employed was a combination of natural rubber (80 parts by weight), styrene/butadiene rubber (20 parts), N351 Black (35 parts), plus minor amounts of other conventional ingredients. The rubber was of such a quality that after curing at 160° C. for 20 minutes, it had the following characteristics: 300% modulus of 1250-1550 psi; tensile strength of about 3400 psi; elongation to break of 500%; and hardness (Shore Type A Durometer) of about 60. The 1260/1/2 tire cords were warped at 36 ends/inch, while the 1890/1/2 cords were warped at 32 ends/inch (vs. 24 in D-4393-85). After embedment of the cords in rubber stock (15 mil stock for 1260/1/2 cord and 24 mil stock for 1890/1/2 cord), the sample was cured at 160° C. +/−2° C. for 20 minutes at 62 kN pressure. Since hot adhesion was desired, the samples were heated in the Instron oven at 120° C. +/−2° C. for 25 +/−5 minutes prior to testing. The separation force was based on Option 1 (the mid-line between the high and low peaks of separation force). Four samples per item were tested and the results were reported as average force in pounds per inch.

EXAMPLES

Control 1

Freshly spun filament yarn of polyhexamethylene adipamide of 70 relative viscosity as measured in U.S. Pat. No. 2,385,890 and containing 64 parts per million copper as a stabilizer in the form of a cupric salt was two-stage drawn (5.2-5.5×), annealed 220°-228° C.), relaxed (5-7%) and wound according to the process described in U.S. Pat. No. 3,311,691. Finish (1.2 weight percent based on weight of yarn) was applied to the yarn as a neat oil at about 75° C. via a kiss roll applicator located at the bottom of the spinning chimney, just before the feed roll; this is usually referred to as the "spin" finish. The principle ingredient of the "spin" finish (67 wt. % on wt. of finish) was the lubricant, coconut oil, which has an m.p. of 24°-27° C. The other finish ingredients were polyoxyethylene non-ionic surfactants (30 wt. %) and a hindered phenolic antioxidant (3 wt. %). The tire yarn so produced was 1890 denier and contained 280 filaments. It had a typical tire yarn tenacity of 9.8 g/den. as measured with 2.5 tpi yarn twist.

The above tire yarn was converted into a conventional 2-ply 1890/1/2 tire cord (singles twist=8.1 "Z" tpi; cable twist=8.1 "S" tpi) and processed on a multi-end, 3-oven hot stretching unit using the following process parameters in ovens 1/2/3: temperature=120° C./235° C./230° C.; exposure time=107/35/54 seconds; applied stretch=7.3/1.5/−2.0%. Cords were passed through a resorcinol-formaldehyde-latex (D5A) dip (15% dip solids) under ambient conditions (21°-27° C.) before entering the first oven. The greige 1890/1/2 tire cord (before dipping and stretching) was characterized for wicking of RFL dip in a cold room at 0° C. and the data are plotted in FIG. 1.

Although Control 1 was an excellent tire cord in most respects, it gave lower than desired wicking of dip materials.

CONTROL 2

Another polyhexamethylene adipamide yarn, Control 2, was prepared in the same manner and with the same kind of finish as Control 1, except that the finish on yarn was 1.0%, the denier was 1260 and the filament count was 210. The tire yarn so prepared was converted into 2-ply 1260/1/2 tire cord (singles twist= "Z" tpi; cable twist=10 "S" tpi) like Control 1 using the following process conditions in ovens 1/2/3: temperature=120° C./235° C./230° C.; exposure time =120/40/40 sec.; and applied stretch= 5.1/5.1/2.9%. In separate tests, the cord was passed through an RFL dip bath containing either 5, 10, 15 or 20% D5A before entering the first oven.

EXAMPLE 1

This Example describes the preparation of 1260 denier polyhexamethylene adipamide tire yarn which was prepared like Control 2, except that the finish composition was 66.7% PETP (m.p. 11°-12° C.), 29.3% sorbitan trioleate/20 EO, 3.0% 4,4'-Butylidene-bis-(6-t-butyl-m-cresol) and 1.0% phenylmethyl dimethyl polysiloxane and the finish on yarn was 0.9%. The principle difference in the finish was the use of the low-melting (11°-14 12° C.) lubricant, PETP. The yarn was converted to tire cord samples under the same conditions as Control 2. Dip pickup (DPU) and hot 2-ply adhesion values for the cords are given in Table 1.

Example 1 dip-stretched cords showed a significant advantage over Control 2 in hot 2-ply adhesion of about 50 to 125% when the dip bath solids were in the range of 5 to 10%; the advantage appears to be largely lost at the higher (15-20%) levels of dip solids.

EXAMPLE 2

Another polyhexamethylene adipamide tire yarn, Example 2 was prepared in the same manner and with the same finish as the tire yarn of Example 1, except that it was 1890 denier (280 filaments) and contained about 1.1% finish on yarn. The yarn was converted into greige tire cord under the conditions used for Control 1. The greige cord of Example 2, was compared with Control 1 cord for wicking of D5C RFL dip (15% solids) under cold room (0°0 C.) conditions; results are plotted in FIG. 1. It can be seen that Example 2 cord, containing the lower melting lubricant, PETP, on the precursor tire yarn, wicked the dip materials many times faster (4x to 9x) than Control 1 cord, which contained a higher melting lubricant on the precursor yarn.

TABLE 1

| RFL Dip Bath Solids | Control 2 | Example 1 |
|---|---|---|
| | DPU, % | |
| 5% D5A | 1.5 | 1.7 |
| 10% D5A | 3.7 | 3.4 |
| 15% D5A | 4.8 | 5.4 |
| 20% D5A | 5.7 | 6.7 |
| | HOT (120° C.) 2-PLY ADHESION, LBS/INCH | |
| 5% D5A | 12 | 27 |
| 10% D5A | 21 | 32 |
| 15% D5A | 34 | 32 |
| 20% D5A | 35 | 40 |

I claim:

1. A polyamide yarn especially suitable as a tire yarn having 0.2-2.0 wt. % of finish, said finish consisting essentially of 50-95 wt. % pentaerythritol tetrapelargonate, 5-50 wt. % of the finish is a sorbitan triester adduct having 10-30 moles of ethylene oxide, 0-5 wt. % of the finish is antioxidant and 0-2 wt. % of finish is a polysiloxane.

2. The yarn of claim 1 wherein the antioxidant is 4,4'-Butylidene-bis-(6-t-butyl-m-cresol).

3. The yarn of claim 1 having a hot (120° C.) 2-ply adhesion of greater than 20 lbs. per inch at a RFL bath solids level of 5%.

4. The yarn of claim 1 wherein 100% of the lubricants is pentaerythritol tetrapelargonate.

5. The yarn of claim 3 wherein 100% of the lubricants is pentaerythritol tetrapelargonate.

6. The yarn of claim 1 wherein the polyamide is polyhexamethylene adipamide.

7. The yarn of claim 3 wherein the sorbitan triester adduct is sorbitan trioleate adduct with 20 moles of ethylene oxide.

* * * * *